(12) United States Patent
Käki et al.

(10) Patent No.: US 7,186,823 B2
(45) Date of Patent: Mar. 6, 2007

(54) TYPE OF CATIONIC STARCH PRODUCT, PREPARATION THEREOF AND ITS USE

(75) Inventors: Jouko Käki, Turku (FI); Hendrik Luttikhedde, Turku (FI); Kari Nurmi, Raisio (FI); Gösta Brunow, Kyrkslatt (FI); Hanna Grano, Helsinki (FI); Anneli Hase, Helsinki (FI); Aki Laine, Espoo (FI); Jari Yli-Kauhaluoma, Helsinki (FI)

(73) Assignee: Ciba Specialty Chemicals Corporation, Tarrytown, NY (US)

( * ) Notice: Subject to any disclaimer, the term of this patent is extended or adjusted under 35 U.S.C. 154(b) by 883 days.

(21) Appl. No.: 10/296,387

(22) PCT Filed: May 23, 2001

(86) PCT No.: PCT/FI01/00498

§ 371 (c)(1),
(2), (4) Date: Nov. 25, 2002

(87) PCT Pub. No.: WO01/90199

PCT Pub. Date: Nov. 29, 2001

(65) Prior Publication Data

US 2003/0177915 A1    Sep. 25, 2003

(30) Foreign Application Priority Data

May 25, 2000    (FI) .................................. 20001266

(51) Int. Cl.
*C08B 31/12*    (2006.01)

(52) U.S. Cl. .......................................... 536/45; 514/60

(58) Field of Classification Search ................. 536/45; 99/485

See application file for complete search history.

(56) References Cited

U.S. PATENT DOCUMENTS 6,855,819 B2 *    2/2005    Likitalo et al. ............. 536/124

FOREIGN PATENT DOCUMENTS

| EP | 0277633 | 8/1988 |
|----|---------|--------|
| EP | 0406837 | 1/1991 |
| GB | 2063282 | 6/1981 |

OTHER PUBLICATIONS

Simkovic, I. Carbohydrate Polymers, 1997, 34 (21-23.*
Simkovic, I. Carbohydrate Polymers, 1996, 31, 47-51.*

* cited by examiner

*Primary Examiner*—Shaojia Anna Jiang
*Assistant Examiner*—Ganapathy Krishnan
(74) *Attorney, Agent, or Firm*—Shiela A. Loggins

(57) ABSTRACT

A cationic starch product, the making of it and its use. The starch product comprises starch (St) and a cationising reagent, which is made from choline or its synthetic equivalent, whereby the cationising reagent has reacted with a part of the hydroxyl groups of the starch according to the structure formula (VI) or (VII). The structure component A is a hydrocarbon chain. The substituents R are hydrogens; lower or higher acrylic alkly groups, substituted or unsubstituted cycloalklyl groups; substituted or unsubstituted aryl or heteroaryl groups; lower or higher alkyl groups or non-aromatic heterocyclic groups containing alkoxy groups or other hetero atoms.

6 Claims, No Drawings

TYPE OF CATIONIC STARCH PRODUCT, PREPARATION THEREOF AND ITS USE

This application is the US national phase of international application PCT/FI01/00498 filed 23 May 2001 which designated the U.S.

This invention relates to a cationic starch product of a new type defined in the preamble of the first claim presented below. The invention relates also to the making of it and to its use.

Cationic starches are used as additives in papermaking, among other things to increase retention and to improve the paper's properties, such as tensile strength, bursting strength, tearing strength and printability. Highly cationic starches in solution form are further used to remove interfering anionic substances at the wet end of a paper machine. The starch is cationised by processing the starch together with reagents containing cationic groups. A cationising reagent of this type may contain cationic groups of amino, immonium, ammonium, sulphonium or phosphonium, but at the present the most important industrial cationic starches are made by etherifying starch with compounds containing tertiary amino groups or quaternary ammonium groups. Of these the starches containing quaternary ammonium groups are the most preferred, because they are cationic both in acidic, neutral and basic (alkaline) conditions.

The above mentioned quaternary starches can be used also for the purifying of process water and waste water, particularly in order to bind and flocculate anionic impurities, and to bind heavy metals and create complexes of them.

Quaternary cationic starches are made by creating covalent ether or ester bonds between a cationising reagent and the hydroxyl groups of the starch structure. In addition to the cationising treatment, industrial cationic starches are also often modified by esterifying or etherifying them with short-chained carbohydrates, by anionic treatments, by cross-linking, and by oxidising.

The earliest information about cationic starches used as additives in paper were presented in the U.S. Pat. No. 2,813,093 in 1957, and after that the cationic starches belong to the most common chemicals at the wet end in the papermaking (see e.g. Modified Starches: Properties and Uses, ed. O. B. Wurzburg, CRC Press; Fla., Boca Raton, 1986).

Cationic starches are still developed for applications concerning paper, water purification, and other applications. At present the cationic tertiary or quaternary aminoalkyl ethers of starch are the most common additives in papermaking.

A small addition of cationic starch in the papermaking provides mainly three advantages: the strength of the paper increases and the amount of fine substances in the paper mill's white water is reduced, i.e. an improved bonding of fine substances and pigments to the paper web, and further a reduced water retention in the web.

In the textile industry the cationic starches can improve the textile feel of a fabric, and in waste water treatment the retention of anionic impurities is improved in the flocculating process.

Generally starch has been made cationic by compounds of petrochemical origin. An exception is the cationising of starch by esterifying it with a natural betaineamino-acid containing a quaternary ammonium group, the process representing this being presented in the Finnish patent application WO 00/15669.

In the manufacturing process of cationic stock or surface size starches a problem is formed by the too high water solubility when at high substitution degrees (DS >>0.05) are aimed. When starch is cationised in a water slurry the obtained product should be filterable and dryable in granulate form. The filterability of starch can be improved by reducing the water solubility of the cationic starch by cross-linking, or by increasing the hydrophobicity. It is also possible to use salts which reduce the solubility, such as sodium sulphate,. Cross-linking is not always desired, as the cross-linking process changes the polymer structure of the starch into a net-like form, which can enclose active cationic groups and prevent their effective action, and in addition the starch is difficult to control and the starch may easily form a completely insoluble product. However, the finished starch product must remain in a water soluble form, so that it can be used e.g. as a retention agent in papermaking or in the treatment of waste water.

Thus the object of this invention is to provide a cationic starch product, which is better and more versatile than previous ones, and a method for making it, where the above-mentioned disadvantages are minimised.

In order to minimise the above mentioned disadvantages the cationic starch product of a new type according to the invention, the making of it and its use are characterised in what is defined in the characterising parts of the independent claims presented below.

Thus a typical water soluble cationic starch product according to the invention is formed by etherifying starch and a separately made cationising reagent. The cationising reagent is typically an etherifying product between on the one hand choline or its synthetic equivalent, and on the other hand epichlorohydrin.

The cationicity of the cationic starch ethers of the new type according to the invention is caused by the choline contained in the molecule. The choline used in the making of the cationic starch product can be of natural origin, or it may be a synthetic equivalent of choline, whereby the choline can also contain other substituents R than hydrogen in the carbon skeleton of the choline. Further there may be an intermediate chain A between the choline and the ether bond of the starch.

Thus, an important advantage of the new cationic starches according to the invention is that their water solubility, i.e. their hydrophilic and hydrophobic properties, can be changed in a controlled manner within wide limits by adjusting the length and/or the composition of the substituents R and/or the intermediate chains A in the used cationising reagent, however so, that the cationic starch produced in this manner does not completely lose its solubility in water. Thus, the solution according to the invention makes it possible that the water solubility of the cationic starches can be controlled within much wider limits than previously.

Water solubility means that the starch product dissolves into water, either at room temperature or at a higher temperature, however at the latest when cooked.

With the cationising reagent according to the invention it is also possible to make highly cationic starch solutions and to control their hydrophobicity within wide limits. They are intentionally made in solution form. Their substitution degree (DS) can be between 0.1 and 1.2, typically between 0.1 and 0.8.

A typical cationising reagent according to the invention thus contains in its structure in a covalently bonded form, most advantageously a choline i.e. a (2-hydroxyethyl)trimethylammonium structure either as a hydroxide, halogenide or as an other similar salt, and a hydrophilic or a hydrophobic component of varying structures.

The etherifying reaction of starch with the cationising reagent containing choline can be made either

- as a dry process without any solvent,
- as a slurry cationisation, where water acts as medium,
- as a gel cationisation, where water acts as a solvent, or
- in an organic solvent in the presence of a basic catalyst. When required, an agent which prevents gelation can be added.

In the making of weakly cationic starch, when the cationising occurs in a water medium, the obtained product can be filtered and dried in a granulate form, as mentioned above. The solution according to the invention makes it possible to adjust a desired water solubility for the cationic starch product in a controlled manner, i.e. so that the filterability is guaranteed without totally losing the solubility in water. When desired, in the solution according to the invention the water solubility can be further controlled by cross-linking or by increasing the hydrophobicity. It is also possible to use agents which reduce the solubility, for instance salts, such as sodium sulphate, or water soluble organic solvents, such as ethanol, which act as agents preventing gelation.

The dependence of the water solubility on the type and length of the carbon chains is described e.g. in the book A. T. Florence and D. Atwood: Physiochemical Principles of Pharmacy, $2^{nd}$ edition, Macmillan Press; London, 1988, p. 132. Now the invented cationising reagents possess the advantage, that the cationic choline-ether starches have an essentially longer intermediate chain between the cationic group and the starch structure than traditional cationic starches (U.S. Pat. No. 4,127,563, 1978; and Nachtergaele, W., The Benefits of Cationic Starches for the Paper Industry, Starch/Stärke 41, 1989, 27–31; and Hellwig, G., Bischoff, D., and Rubo, A., Production of Cationic Starch Ethers Using an Improved Dry Process, Starch/Stärke 44, 1992, 69–74). A longer intermediate chain acts so that the cationic groups can better interact with the anionic cellulose fibres and the anionic fillers.

In the solution according to the invention it is thus essential that the cationised starch is made by etherifying starch with cationising reagents synthesised from choline, whereby choline in this application means, if not otherwise stated, both natural choline and its synthetic equivalents. Thus in the solution according to the invention it is possible to use choline, where hydrogen in its carbon skeleton is replaced also by other substituents. A synthetic choline equivalent can be made e.g. from trimethylamine or from any compound containing epoxide or chlorohydrin.

According to the invention cationic starch can thus be typically made by etherifying starch with a cationising reagent, which is either

- an etherifying product between choline or its synthetic equivalent (I) and epichlorohydrin (III), most advantageously 5,6-epoxy-1-trimethylammonium-3-oxahexane (II), or
- an etherifying product formed by choline, an intermediate chain of a certain type, and epichlorohydrin.

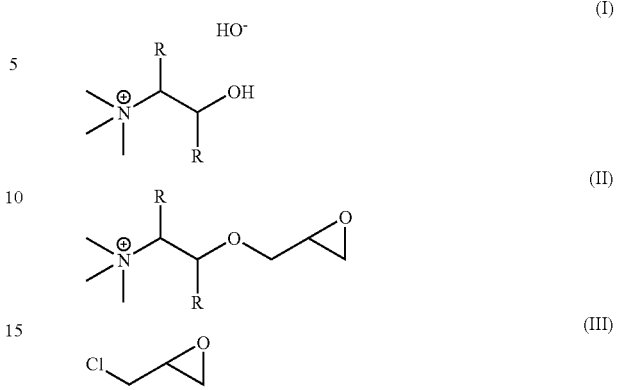

The positive charge of the quaternary amino group of choline is always neutralised by some anion, which depends on the reaction conditions, usually hydroxide or chloride, but it may also by some other halide, (fluoride, bromide or iodide), hydro-carbonate, hydrotartrate, dihydrocitrate, salicylate, or some other such inorganic or organic anion. In structure formulas, which contain a quaternary amino group, the anion is not generally shown, but structurally it belongs to the presently made cationising reagents, and it depends on the reaction conditions by nature.

The cationic starch product according to the invention, which contains said choline, can be advantageously used as an additive in the papermaking, e.g. at the wet end of the papermaking in order to improve, among other things, retention, water transmittance, the strength of the produced paper, and to remove anionic impurities. Then it is possible to adjust the water solubility of the cationic starches prepared according to this invention by varying the structure of the choline derivative used in the etherifying, in other words, by changing the chemical structure of the intermediate chain, which joins the choline and epoxypropyl components of the cationising reagent, or the side chains (R) of the choline section. Thus, by using a lipophilic intermediate chain with a hydrocarbon structure it is possible to reduce the water solubility of starch ether. On the other hand, the water solubility of the starch ether can be correspondingly increased by using a hydrophilic intermediate chain with the structure of ethyleneglycol or a corresponding polyether, or by using another corresponding hydrophilic intermediate chain, to join the choline and epoxypropylene components of the cationising reagent to each other. In the choline skeleton the substituents (R) are hydrogen or organic groups, such as e.g. alkylic and/or arylic groups, which may contain heteroatoms, particularly oxygen, nitrogen or sulphur. The substituents are typically hydrogen and/or methyl groups.

Choline or (2-hydroxyethyl)trimethylammoniumhydroxide (I) is a substance, which commonly occurs in nature, and which has important biological and pharmacological effects. Choline is indispensable e.g. as an transmitter substance in the nervous system, and in addition many important phospholipides contain it, such as for instance lecithin or phosphatidyle choline. Phospholipides act as strong detergents, where the cationic components keep the lipids, bonded by an anionic fatty acid, emulgated in the water phase. Choline is generally used e.g. in vitamin products intended for humans and as an additive in animal feed. Choline is a compound containing a quaternary trimethylammonium group, where the positive charge of the ammonium group is neutralised by a hydroxide ion acting as a compensating ion, or by a chloride or other halide anion, and in some cases also a dihydric citrate, a hydrotartrate, hydrocarbonate or a salicylate anion, or by another such inorganic or organic anion.

The starch can be any naturally occurring starch, such as mucostarch (e.g. potato), root starch (e.g. tapioca, arrow root, or batata), or grain starch (e.g. barley, wheat, rice, corn or durra). In the etherifying process there can also be used "waxy" starches, modified starches, cross-linked starches, hydrolysed or oxidised starches, acid processed starches, or even other polysaccharides with long chains.

Epichlorohydrin (III) is an 1,2-epoxy-3-chloropropane available on the markets, where the reactive functional groups are a three-membered epoxy ring and a chlorine atom bonded to a primary carbon atom. Of the functional groups of epichlorohydrin the epoxy ring is more reactive than the primary alkylchloride, and it reacts easily with such compounds as alcohols, carboxylic acids, phenols, amines, thiols, and thiophenols. Epichlorohydrin dissolves in alcohols, ethers, ketones, and aromatic hydrocarbons. It barely dissolves in water at room temperature whereby it forms a 6.6% by weight solution with water.

Starch ethers and cationic starch ethers, the making of them, and their properties and applications were already known as such for decades, such as they are presented for instance in the book Starch: Chemistry and Technology, $2^{nd}$ Ed., edited by R. L. Whistler, J. N. BeMiller, and E. F. Paschall, Academic Press Inc.; Orlando, Fla., 1984; and in the book Modified Starches: Properties and Uses, edited by O. B. Wurzburg, CRC Press; Boca Raton, Fla., 1986. Hydroxylethers of starch can be used for instance in the papermaking and as substitutes of blood plasma, hydroxypropylethers of starch are used as additives in food, and starch ethers containing cationic groups are used in the papermaking.

Previously an ion exchange material, which is completely insoluble in water, has been made of starch, epichlorohydrin and choline, in a so-called "one pot" synthesis, whereby all reagents were added individually to the mixture of starch in water (Simkovic, I., Quaternization/cross linking of starch with choline chloride/epichlorohydrin, Carbohydrate Polymers, 34, 1997, 21–23). This method produces a highly cross-linked cationic product, which due to the high degree of cross-linking, i.e. the high molecular weight of the product, is insoluble in water. Therefore this product could not be used in such applications where the product must be dissolved in water. On the other hand, the use of epichlorohydrin is also restricted by its toxicity and volatility. It would be very difficult to use in industrial environments, particularly combined with a powder-like substance like starch. Thus this starch product has not been proposed for use as an additive in the papermaking, but it was proposed to be used as an ion exchange material.

In the cationising reagent according to the invention it is possible with the aid of ether bonds to add different types of structures between the glycidyl groups originating from the choline and epichlorohydrine, such structures being e.g. hydrocarbon or polyether chains. The etherifying of choline with an intermediate chain can be made using commonly known reactions, such as the so-called Williamson's ether synthesis (Vogel's Textbook of Practical Organic Chemistry, John Wiley & Sons, Inc.; New York, 1989, p. 583–584). In the presence of a strong base, alcohols, such as choline, form alkoxides. An alkoxide made from choline will easily react with the halogen group of primary haloalcohols, such as with chlor in 6-chlorine-1-hexanol, and with chlor in 2-(2-(2-chloroethoxy(ethoxy)ethanol, whereby it forms ether derivatives of choline, which can be further etherified with epichlorohydrin in alkaline reaction conditions. A cationising reagent prepared in this fashion is easily etherified with starch.

In this invention there is used a reaction product of
choline and epichlorohydrin, or
choline, a halogenated alcohol, i.e. haloalcohol, and epichlorohydrin for the cationising of starch. In this way a strongly or weakly cationised starch is obtained, depending on the used ratios of the substance amounts of the reagents. The product's solubility in water can also be adjusted by varying the length and structure of the hydrocarbon or polyether chain (A) between the choline and the glycidyl group, i.e. the epoxypropylene group, originating from the epichlorohydrin. The products made in this manner are suitable as additives in the papermaking for removing interfering substances, for improving retention, for reducing water retention, and for increasing the paper's strength and printability. The starch described in this invention can also be used for removing fine substances from the process water in the production of TMP pulp, which is described in the article by V. Bobackan, J. Näisman and D. Eklund (Journal of Pulp and Paper Science, 24, 1998, 78). On the other hand, the presently made cationic choline structured starch ethers could be used also in the enrichment of metals or for making complexes of heavy metals, or to flocculate anionic impurities from process water and waste water in different applications of environmental technology.

The cationic choline ether of starch according to the invention is typically made by etherifying the hydroxyl groups of the starch by using a cationising reagent containing choline i.e. the salt structure of 2-(hydroxyethyl)trimethylammonium. The cationising reagent (II), which is used in the etherfying of starch, and which contains choline in covalent bonds, is made for instance by allowing choline, most advantageously choline chloride to react with epichlorohydrin in the presence of a suitable base, most advantageously sodium hydroxide, in alcohol at a temperature of 20 to 100° C., advantageously 35 to 45° C. during 2 to 10 hours. The product is separated from the reaction product by precipitation or decantation, and by evaporating the obtained solution to dry state. It is also possible to wash the raw product with small amounts of water-free tetrahydrofurane.

An alternative reaction path for making the cationising reagent (II) is the reaction of chlorocholinechloride, i.e. (2-chloroethylene)trimethylammoniumchloride with glycidol in the presence of a suitable base in a suitable organic solvent or in water.

The choline component of the cationising reagent can be made also directly from a compound containing trimethylamine and an epoxide or chlorohydrin group. Such a compound can be for instance alkyleneoxide or alkylenechlorohydrin. If the alkylene is longer than ethylene, then the choline component will contain a side chain (R) originating from the used alkylene reagent, whereby the side chain can be aliphatic, aromatic, or the like. The side chain can also contain heteroatoms, such as oxygen, nitrogen, or the like.

Another type of cationising reagent for starch, which reagent contains both a covalently bonded choline group and a glycidyl group, has the structure of the structure formula (IV). It has an intermediate chain of hexamethylene-glycol, which separates the choline and the glycidyl component originating from the epichlorohydrin. A cationising reagent of this type can be made by letting choline, most advantageously cholinechloride or cholinehydroxide, react in the presence of a suitable basic catalyst, most advantageously sodium hydroxide, with 6-chlorine-1-hexanol. Then the obtained cholinehexamethylglycolether is further allowed to react with epichlorohydrin in the presence of a suitable basic catalyst, most advantageously sodium hydroxide. This provides a cationic etherifying reagent, 12,13-epoxy-1-trimethylammonium-3,10-dioxatridecane (IV).

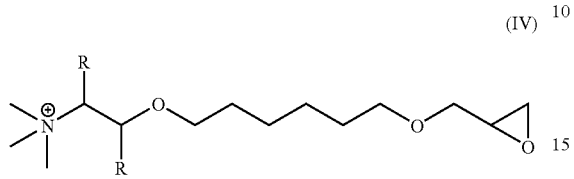

(IV)

A cationising reagent of a third type for starch contains both a covalently bonded choline group and a glycidyl group according to the structure formula (V). It contains a triethyleneglycol chain as an intermediate chain which separates the choline and the glycidyl component which originates from the epichlorohydrin. A cationising reagent of this kind can be made by allowing choline, most advantageously choline chloride or choline hydroxide, react with 2-[2-(2-chloroethoxy)ethoxy]ethanol in the presence of a suitable basic catalyst, most advantageously sodium hydroxide. The choline ether thus obtained is further allowed to react with epichlorohydrin in the presence of a suitable basic catalyst, most advantageously sodium hydroxide. This provides a cationic etherifying reagent, 14,15-epoxy-1-trimethylammonium-3,6,9,12-tetraoxapentadecane (V).

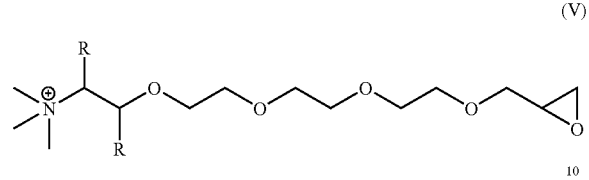

(V)

In addition to the above presented cationising reagent structures it is possible to make also such reagents in which the separating chain between the choline and glycidyl components can be any other suitable intermediate chain instead of the hexamethylglycol chain or the triethyleneglycol chain.

Below there are presented typical structures of the cationic starch ethers made from choline. In the case shown by the structure formula (VI) the starch is etherified with a reaction product between choline (I) and epichlorohydrin (II), or with the 5,6-epoxy-1-trimethylammonium-3-oxahexane (II). In the following structure formulas the abbreviation St represents the polymer structure of starch. The epoxypropylene ring of the etherifying reagent (II) is opened when it is etherified with starch in the presence of a suitable catalyst. As such etherifying catalysts there can be used sodium hydroxide, potassium hydroxide, calcium hydroxide, calcium oxide, magnesium oxide, carbonates of potassium, sodium or cesium, or pyridine, or other such organic or inorganic bases. This produces the cationic starch according to the structure formula (VI).

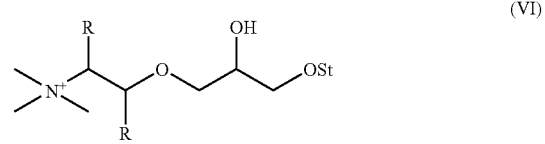

(VI)

In a case utilising the structure formula (VI) the starch has been etherified with a cationising reagent, where the chain A and the hydroxypropyl group originating from epichlorohydrin is attached via an ether bond between the choline (I) and the starch:

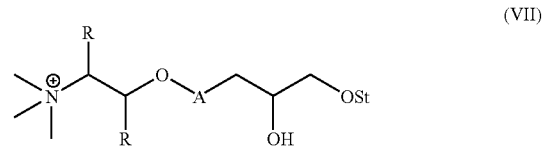

(VII)

where the structure component A is a hydrocarbon chain and/or an organic group, which may contain heteroatoms, such as oxygen, nitrogen or sulphur, substituted or unsubstituted aromatic or heteroaromatic groups, which can be attached to each other also via alkyl groups or heteroatoms, or substituents containing them, side chains, which can be hydrogen, lower or higher acyclic alkyl groups, substituted or unsubstituted cykloalkyl groups, alkoxy groups or other groups which contains lower or higher alkyl groups or non-aromatic heterocyclic groups containing heteroatoms.

In other words the structure component A can be for instance an organic group, which has one of the formulas below:

—$(CR_1R_2)_n$—O—, where n=1, 2, 3, . . .    (i)

—$[(CR_1R_2)_nO]_m$—, where n=1, 2, 3, . . . and m=1, 2, 3, . . .    (ii)

—$(CR_1R_2)_n$—S—, where n=1, 2, 3, . . .    (iii)

—$[(CR_1R_2)_nS]_m$—, where n=1, 2, 3, . . . and m=1, 2, 3, . . .    (iv)

—$(CR_1R_2)_n$—$NR_3$—, where n=1, 2, 3, . . .    (v)

—$[(CR_1R_2)_nNR_3]_m$—, where n=1, 2, 3, . . . and m=1, 2, 3,    (vi)

The substituents R, $R_1$, $R_2$, $R_3$ appearing in the structure formulas (II) and (IV) to (VII) and in the formulas (i) to (vi) can be hydrogens; lower of higher acyclic alkyl groups; substituted or unsubstituted cycloalkyl groups; substituted or unsubstituted aryl groups or heteroaryl groups; lower or higher alkyl groups or non-aromatic heterocyclic groups containing alkoxy groups or other heteroatoms. On the other hand the organic group A can also contain in its actual chain structure such substituted or unsubstituted aromatic or heteroaromatic groups, which can be attached to each other also via alkyl groups or heteroatoms or substituents containing them. The substituents R, $R_1$, $R_2$, $R_3$ are typically hydrogen, and/or alkyl groups, advantageously methyl groups and/or aryl groups.

The etherifying reaction of the starch is performed as a dry process without solvent;

as a slurry cationisation, where water acts as the medium and where the starch must not substantially dissolve, DS is typically<0.1;

as a gel cationisation, where the starch dissolves as water acts as the solvent, DS is typically >0.1, most typically 0.1 to 1.0; or in an organic solvent, such as in ethanol.

As etherifying catalyst a base is used, such as alkali metal or alkali earth hydroxides, calcium oxide, magnesium oxide, alkali metal carbonate, or organic bases, such as amines.

In the water suspension the reaction temperature is 0 to 100° C., advantageously 40 to 70° C., whereby the reaction time is 1 h to 5 days, advantageously 4 to 24 h. Without solvent the etherifying is made at a higher temperature than the water suspension, advantageously at 50 to 80° C. If gelation of the starch is wanted to be prevented, then it is possible to add inorganic or organic salts to the water suspension, advantageously sodium sulphate, or alcohols, such as methanol and isopropanol, advantageously ethanol. After the etherifying reaction the cationised starch can be cleaned with water and alcohols, and neutralised with dilute acids. However, a thorough cleaning of the product is not necessary when the starch is used in papermaking.

Below we illustrate the invention is illustrated with the aid of examples.

EXAMPLE 1

Etherifying of Starch with 5,6-epoxy-1-trimethylammonium-3-oxahexane (II) in a Water Solution.

| | |
|---|---|
| 10.00 g | potato starch |
| 6.00 g | sodium sulphate |
| 1.23 g | sodium hydroxide |
| 6.04 g | 5,6-epoxy-1-trimethylammonium-3-oxahexane (I) |
| 23 ml | water |

10.00 g starch was admixed to 20 ml water in a round-bottomed flask. 6.00 g water-free sodium sulphate was added to the mixture, and then there was added 1.23 g sodium hydroxide, which had been diluted in 3 ml water at a temperature of 30° C. 6.04 g 5,6-epoxy-1-trimethylammonium-3-oxahexane (II) was added to the mixture, and mixing was continued during 23 h at 40° C. 140 ml water was added to the reaction mixture, and it was mixed carefully. Then again 240 ml ethanol was added to the mixture, and the thus precipitated starch was filtered. The raw produce was washed with 240 ml 50% ethanol, and then the product was further washed and neutralised with 480 ml 50% ethanol, to which 0.01 moyll hydrochloric acid had been added. Washing was continued with 80 ml 50% ethanol and with 100 ml 99.5% ethanol. The cationised starch (VI) was dried in vacuum. The yield was 12.00 g. The substitution degree was determined to be 0.11 by a Kjeldahl type determination and by 1H-NMR spectrometry.

EXAMPLE 2

Etherifying of Starch with 5,6-epoxy-1-trimethylammonium-3-oxahexane (II) in a Solution of Water and Ethanol.

| | |
|---|---|
| 10.00 g | potato starch |
| 0.69 g | sodium hydroxide |
| 20 ml | ethanol |
| 10 ml | water |
| 1.21 g | 5,6-epoxy-1-trimethylammonium-3-oxahexane (I) |

10.00 g potato starch, 10 ml water and 20 ml ethanol were mixed in a round-bottomed flask. 0.69 g sodium hydroxide was added to the mixture, whereby the sodium hydroxide hade been diluted in 2 ml water at a temperature of 30° C., and then mixing was performed. 1.21 g 5,6-epoxy-1-trimethylammonium-3-oxahexane (II) was added to the mixture. Mixing was continued for 24 h at 40° C. 80 ml ethanol was added to the reaction mixture, and the cationised starch was filtered and washed with 160 ml 50% ethanol. The raw produce was washed and neutralised with 320 ml 50% ethanol, which contained 0.03 mol/li hydrochloric acid. Washing was continued with 160 ml 50% ethanol and with 80 ml 99.5% ethanol. The product (VI) was dried in vacuum. The yield was 8.87 g. The substitution degree was determined to be 0.02 by a Kjeldahl type determination and by 1H-NMR spectrometry.

EXAMPLE 3

Etherifying of Starch with 12,13-epoxy-1-trimethylammonium-3,10-dioxatridecane (IV) in a Water Solution.

| | |
|---|---|
| 5.00 g | potato starch |
| 3.00 g | sodium sulphate |
| 0.56 g | sodium hydroxide |
| 3.58 g | 12,13-epoxy-1-trimethylammonium-3,10-dioxatridecane (IV) |
| 18 ml | water |

5.00 starch was admixed to 12 ml water in a round-bottomed flask, and then 3.00 g sodium sulphate was added to it. Then 0.56 g sodium hydroxide was added to it, which had been dissolved in 3 ml water at 30° C., and 3.58 g 12,13-epoxy-1-trimethylammonium-3,10-dioxatridecane (IV), which hade been dissolved in 3 ml water. The reaction mixture was mixed for 23 h at 40° C. Then, when the mixture had cooled to room temperature, 160 nil water was added. After mixing further 240 ml ethanol was added to the mixture, and the precipitated starch ether was filtered. The raw produce was washed with 80 ml 50% ethanol. The dissolving into water and the ethanol precipitation of the raw produce was repeated three times, after which hydrochloric acid was added to the solutions until the washing solution was neutral. Finally the product (VII, A=—$(CH_2)_6O$—) was washed with 95% ethanol and dried in vacuum. The yield was 5.46 g. The substitution degree was determined to be 0.1 by $^1$H-NMR spectrometry.

EXAMPLE 4

Etherifying of Starch with 14,15-epoxy-1-trimethylammonium-3,6,9,12-tetraoxapentadecane (V) in a Water Solution.

| | |
|---|---|
| 5.00 g | potato starch |
| 3.00 g | sodium sulphate |
| 0.35 g | sodium hydroxide |
| 1.00 g | 14,15-epoxy-1-trimethylammonium-3,6,9,12-tetraoxapentadecane (V) |
| 17 ml | water |

5.00 starch was admixed to 13 ml water in a round-bottomed flask, and then there was added 3.00 g sodium sulphate, 0.35 g sodium hydroxide, which had been dissolved in 2 ml water at 30° C., and 1.00 g 14,15-epoxy-1-trimethylammonium-3,6,9,12-tetraoxapentadecane (V), which had been dissolved in 2.00 ml water. The reaction mixture was mixed for 21 h at 40° C. Then 160 ml water was added to it, and it was mixed. After the mixing 160 ml ethanol was added to the mixture, and the precipitated starch was filtered. The raw produce was washed with 80 ml 50% ethanol. The same dissolving into water and ethanol precipitation was repeated three times, after which hydrochloric acid was added to the washing solutions until the solutions were neutral. Finally the product (VII, A=$CH_2CH_2OCH_2CH_2OCH_2CH_2O$—) was washed with 95% ethanol and dried in vacuum. The yield was 4.53 g. The substitution degree was determined to be 0.05 by $^1$H-NMR spectrometry.

EXAMPLE 5

Etherifying of Starch with 5,6-epoxy-1-trimethylammonium-3-oxahexane (II) in water.

| | |
|---|---|
| 11.3 g | peroxide oxidised potato starch |
| 0.5 g | sodium hydroxide |
| 17 ml | water |
| 10.6 g | 5,6-epoxy-1-trimethylammonium-3-oxahexane (I) |

11.3 g potato starch and 17 ml water were mixed in a round-bottomed flask. 0.5 g sodium hydroxide diluted in 2 ml water at a temperature of 30° C. was added to the mixture and mixing was performed. 10.6 g 5,6-epoxy-1-trimethylammonium-3-oxahexane (II) was added to the mixture. Mixing was continued for 24 h at a temperature of 60° C. The cationised starch was diluted with water about 20% and washed with 160 ml 50% ethanol. The raw produce was washed and neutralised with 320 ml 50% ethanol, which contained 0.03 mol/l hydrochloric acid. Washing was continued with 160 ml 50% ethanol and with 80 ml 99.5% ethanol. The product (VI) was dried in vacuum. The yield was 10.5 g. The substitution degree was determined to be 0.41 by a Kjeldahl type determination.

To a person skilled in the art it is obvious that the above-mentioned cationising reagents containing a quaternary amino group can be made also with the aid of other known organic-chemical reactions. Such alternatives are among others:

1) the nucleophilic substitution reaction of an alkylhalide containing the above-mentioned epoxypropyl group or the glycidyl group, i.e. the Menshutkin reaction with any tertiary amine, most advantageously trialkylamine;
2) if any substituent of the quaternary amino group contains in its structure a halo-hydrine group, i.e. a 1-halo-2-hydroxyl group, then it is possible to allow this to further react with the starch; and
3) epoxidising of such a compound, which contains a quaternary amino group, where one substituent (or more substituents) of the nitrogen atom is a group with an alkene structure, which contains a double bond, with the aid of for instance performic acid, per-acetic acid, or meta-chloroperbenzoic acid, into a corresponding epoxypropyl ether or a glycidyl ether containing a quaternary amino group. With the obtained reaction products starch can be cationised in conditions similar to those described above.

The invention claimed is:

1. A cationic starch product, characterised in that the starch product is a water soluble reaction product of starch and a cationising reagent, whereby in the making of the cationic reagent, which is made from choline, has reacted with a part of the hydroxyl groups of the starch according to the structure formula (VI)

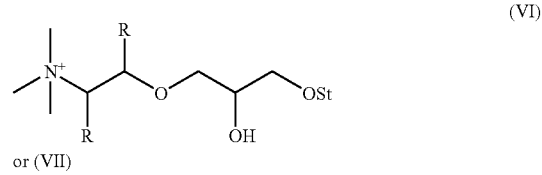

or (VII)

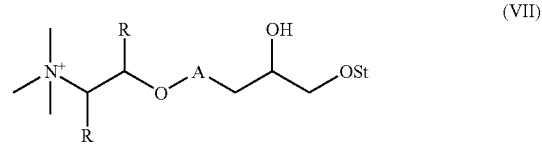

and in which structure formulas (VI) and (VII)
St represents the polymer structure of starch;
the structure component A is a hydrocarbon chain, which has one of the following formulas

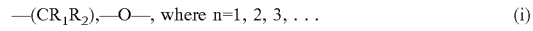

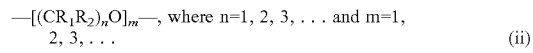

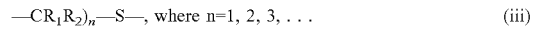

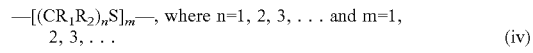

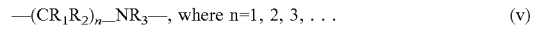

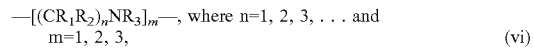

and
the substituents R, $R_1$, $R_2$, $R_3$ are hydrogen alkyl, cycloalkyl and/or aryl groups, which groups can contain heteroatoms, selected from the group consisting of oxygen, nitrogen, and sulfur
and/or the A may be an organic group which contains in its chain structure substituted or unsubstituted aromatic or heteroaromatic groups, which can be attached to each other via alkyl groups or heteroatoms or substitutents containing the aromatic or heteroaromatic groups.

2. A product according to claim 1, characterised in that the substituents R in the choline skeleton are hydrogen, alkyl groups, and/or aryl groups.

3. A product according to claim 1, characterised in that the product dissolves in water at the latest at the cooking temperature of starch.

4. A product according to claim 1, characterised in that the substituent R and/or the structure A are selected so, that the product obtains the desired hydrophobicity or hydrophilicity.

5. A method which comprises adding the starch according to claim 1 to the wet end of an papermaking process.

6. The method according to claim 5, characterised in that the starch improves the retention of fine substances in the fibre, removes anionic interfering substances from the white waters, and improves the water transmittance of the web and improves the strength of the produced paper.

* * * * *